United States Patent [19]

Bussi

[11] Patent Number: 6,093,772
[45] Date of Patent: Jul. 25, 2000

[54] IMMISCIBLE POLYMER COMPATIBILISER SYSTEM

[75] Inventor: Philippe Bussi, Brionne, France

[73] Assignee: Elf Atochem S.A., France

[21] Appl. No.: 08/913,766

[22] PCT Filed: Mar. 25, 1996

[86] PCT No.: PCT/FR96/00443

§ 371 Date: Jan. 29, 1998

§ 102(e) Date: Jan. 29, 1998

[87] PCT Pub. No.: WO96/30447

PCT Pub. Date: Oct. 3, 1996

[30] Foreign Application Priority Data

Mar. 24, 1995 [FR] France ................... 95 03498

[51] Int. Cl.⁷ ............... C08L 53/02; C08L 55/02
[52] U.S. Cl. ................ 525/64; 525/67; 525/71; 525/89; 525/148; 524/504
[58] Field of Search ............... 525/64, 67, 148, 525/71, 89; 524/505

[56] References Cited

U.S. PATENT DOCUMENTS

| | | | |
|---|---|---|---|
| 3,561,493 | 2/1971 | Maillard | 428/36.91 |
| 4,111,895 | 9/1978 | Gergen et al. | 525/98 |
| 4,319,003 | 3/1982 | Gardlund | 525/148 |
| 4,611,833 | 9/1986 | Lescaut | 285/55 |
| 5,472,754 | 12/1995 | Douchet et al. | 428/36.91 |

FOREIGN PATENT DOCUMENTS

| | | |
|---|---|---|
| 2 107 538 | 5/1972 | France . |
| 2 200 321 | 4/1974 | France . |
| 2 564 938 | 11/1985 | France . |
| 2 616 151 | 12/1988 | France . |
| 03052952 | 3/1991 | Japan . |
| 03188160 | 8/1991 | Japan . |
| 2 038 444 | 7/1980 | United Kingdom . |

OTHER PUBLICATIONS

*Polymer*, vol. 31, Aug. 1990, J. Heuschen et al., "Polycaprolactone–based block copolymers: 4 . . . containing polyblends," pp. 1473–1480.

*Macromolecules*, 27, 1994, T. C. Chung et al., "Polypropylene–graft–Polycaprolactone: Synthesis . . . in Polymer Blends," pp. 1313–1319.

PCT/FR96/00443 International Search Report, Jul. 30, 1996.

*Primary Examiner*—James J. Seidleck
*Assistant Examiner*—Olga Asinovsky

[57] ABSTRACT

An immiscible polymer system is disclosed, said system itself ecomprising a stable mixture of polymers that are individually miscible with the polymers to be compatibilized. The compositions consisting of this polymer mixture may be obtained by extrusion.

6 Claims, No Drawings

IMMISCIBLE POLYMER COMPATIBILISER SYSTEM

FIELD OF THE INVENTION

BACKGROUND OF THE INVENTION

The invention relates to associations of immiscible polymers by virtue of the use of a compatibilizing agent also called an emulsifier.

In recent years the literature has extensively described both the advantage of associations of polymers and the problems presented by the use of polymers that are immiscible with each other and the solutions provided by the compatibilizing agents.

In general, these compatibilizing agents themselves consist of polymers, homo- or copolymers, carrying sites or groups permitting the adhesion to the polymers to be associated, these groups being generally either incorporated directly into the chain by polymerization or attached chemically to these compatibilizing polymers (chemical reaction between functional sites, copolymerization, grafting).

Purely by way of illustration of such compatibilizing agents it is possible to mention polystyrene and polycaprolactone block copolymers (Henschen and Teyssie, Polymer, Vol. 31, Aug. 1990 pp. 1473–80), polypropylene graft polycaprolactone which is then, after hydrolysis, modified with ε-caprolactone (Chung, Macromolecules, Vol. 27, 1994 pp. 1313–19), copolymers of styrene/maleic anhydride/unsaturated derivatives modified with caprolactone (JP-A-03.052.952) and ε-polycaprolactone graft maleic anhydride (JP-A-03.188.160).

Other compatibilizing agents consist, for example, of polyolefins modified with an unsaturated carboxylic acid (FR-A-2.107.538), copolymers of an olefin or of styrene and of an unsaturated mono- or dicarboxylic acid or an ester or an anhydride of this acid (FR-A-2.200.321), a graft copolymer consisting of at least one monoamine polyamide oligomer and of an α-monoolefin polymer or copolymer grafted with a monomer that can react with the amine functional group of the oligomer (FR-A-2.626.090), a di- or triblock copolymer consisting of at least one N-vinylpyrrolidone telomer or of methyl methacrylate and of an ethylenically unsaturated polymerizable mono- or difunctional oligomer or of a polycondensable monomer or of a lactam (FR-A-2.616.151) or a block copolymer of polymethyl methacrylate and of polycarbonate (U.S. Pat. No. 4,319,003).

In general, these compatibilizing agents have a chemical structure such that it permits an at least partial miscibility of this agent with the polymers to be compatibilized.

In most cases, obtaining this chemical structure and the insertion of sites promoting at least this partial miscibility in the same polymer backbone (often called backbone polymer or copolymer) requires a group of chemical reactions which are complex and all the more laborious since the chemical structure of such an agent must be closely adapted to the nature of the polymers to be associated. Thus, in general, a compatibilizing agent for the polyamide/polypropylene pair will not fulfil the same compatibilizing function with the PVDF/polyolefin pair.

DESCRIPTION OF THE INVENTION

The first objective of the invention is therefore to propose a simple system for compatibilizing immiscible polymers.

Another objective of the invention is to propose a compatibilizing system not requiring the use of a specially prepared compatibilizing agent for associating these polymers.

The invention also proposes the use of a system that is easily interchangeable as a function of the nature of the polymers to be associated.

Other advantages of the invention will appear on reading what follows.

The subject of the invention is therefore a system for compatibilizing two essentially immiscible, preferably thermoplastic, polymers A and B, a system characterized in that it itself consists of a stable mixture of two, preferably thermoplastic, polymers C and D, each of these polymers C and D being individually at least partially miscible with one of the polymers A and B.

In what follows, the "polymers C and D" will be referred to, it being specified that this expression refers both to homo- and copolymers and extends to mixtures including more than two polymers.

Another subject of the invention is a composition including the two essentially immiscible polymers A and B and the stable mixture of the polymers C and D. It relates very particularly to the compositions including a matrix, a disperse phase and the mixture C/D at the matrix/disperse phase interface. The polymers A, B, C and D, taken separately, are, in general, monophase polymers.

A further subject of the invention is the articles obtained by making use of the compositions described above.

Within the meaning of the invention:

Immiscible polymers refer to polymers whose mixture in the amorphous state, in a melt or in solution in a solvent that is common to the polymers is thermodynamically unstable, that is to say that the free energy of the mixture is higher than the combined value of that of the polymers of which this mixture consists; in other words, the energy of $\Delta G_{mix}$ is positive.

On the other hand, in the same conditions, miscible or partially miscible polymers produce a thermodynamically stable mixture in the case of which the energy of $\Delta G_{mix}$ is negative. Completely miscible polymers produce a one-phase system, while partially miscible polymers give a two-phase system with a very low interfacial energy, expressed by the existence of a very fine dispersion of one polymer within the other.

A stable mixture refers to a pair of polymers C and D such that the interfacial tension $\delta_{CD}$, which is equal to $\delta_C + \delta_D - W_a$ (where $\delta + \delta_D$ are the surface tensions of polymers C and D and $W_a$ is the force of adhesion, that is to say the Gibbs free energy needed to form an interface between polymers C and D) is as low as possible and, preferably, close to 0 and at most equal to 10 mN/m.

A subject of the invention is therefore a system consisting of a stable mixture C/D, within the meaning defined above, which can be employed for compatibilizing polymers A and B which are essentially immiscible with each other within the meaning given above. From the preceding it follows that, in the respect of each polymer pair A or B and constituent C or D of the stable mixture C/D, a compatibilization will be observed via at least one of the following processes for decreasing the interfacial tension:

dissolving of the constituent of the stable mixture in the polymer concerned, formation of interpenetrating networks, cocrystallization, attraction or ionic bonds, van der Wals [sic] bonds or any other mean allowing the interfacial tension between the polymers A and B and the mixture C/D to be reduced.

The invention is applicable to a large number of pairs of immiscible polymers A and B among which, and purely by way of indication, there may be mentioned:

polyethylene (PE)/polyamide (PA)

PE/polyisobutene polypropylene (PP)/other polyolefin

PP/PA

PVC (polyvinyl chloride)/polyolefin

ABS (acrylonitrile/butadiene/styrene)/PA

PA/polycarbonate (PC)

PC/polyester

PC/ABS whose acrylonitrile content results in immiscibility

PVDF (polyvinylidene fluoride)/polyolefin

PVDF/rubber (polyethylene/propylene)

It is obvious that the invention concerns other pairs of immiscible polymers that are not expressly referred to.

With regard to the stable mixture C/D, within the meaning of the invention, the following mixtures may be mentioned, purely by way of illustration and as a function of their judiciously chosen compositions:

PVC/ABS

PVC/ASA (styrene/acrylonitrile grafted onto acrylic polymer)

PVC/PMMA (polymethyl methacrylate)

PVC/polyurethane

PC/SAN (styrene/acrylonitrile copolymers)

ABS/SMA (styrene/maleic anhydride copolymer)

Poly(2,6-dimethyl-1,4-phenylene ether) (PPE)/polystyrene (PS)

PPE/PA

PPE/polyolefin

Chlorinated polyolefin/aliphatic polyester

PC/ABS

Polyetherimide/polycarbonate

Polyetherimide/polyetherketone (PEK) or polyetheretherketone (PEEK)

Polysulphide or polyethersulphide/ABS, PET or PBT (polyethylene or poybutylene [sic] terephthalate)

PVDF/PMMA

It is obvious that the invention concerns other stable mixtures that are not expressly referred to.

The specific choice of the stable mixture C/D within the meaning of the invention, as a function of the pair A/B to be associated, belongs to a person skilled in the art, on the basis of the specifications defined above. As a result, the indications which follow are given purely by way of illustration and cannot limit the invention.

In general, any stable mixture in which each of the constituents is capable of reducing the surface tension between itself and the polymer A (or B) by creation of a covalent bond, crosslinking, formation of interpenetrating networks, cocrystallization or ionic bonding constitutes a compatibilizing system within the meaning of the invention.

The polymers A, B, C and D, taken separately, are monophase polymers.

Specific examples of such systems which may be mentioned are:

the chlorinated polyethylene/unsaturated aliphatic polyester mixture for "compatibilizing" the pairs PVDF or its copolymers/polyethylene, or PVDF/ethylene-propylene rubber, the same mixture for "compatibilizing" the above pairs in which PVDF is replaced with PVF3 (polytrifluoroethylene), PVC or CPVC (chlorinated PVC), the same mixture for "compatibilizing" the PVDF/PP pair.

Among the abovementioned unsaturated aliphatic polyesters, very particular reference will be made to the polyesters chosen from polylactones such as polycaprolactone, polypivalolactone, polyoenantholactone or polycaprylolactone. These polyesters can be employed as such or after grafting, such graft polymers being described, for example, in French Patent Application 94.13368, the content of which is incorporated by reference.

Other polymers or copolymers constituting both the polymers A or B and the mixtures C/D are described in the literature, and these polymers or copolymers or the process for obtaining them do not constitute a subject of the invention.

In general, the compatibilizing systems in accordance with the invention are used in a quantity representing from approximately 1 to approximately 20% of the weight of the combined polymer A+B. In these compositions and in the conforming products resulting therefrom, the proportions of the polymers A and B may, in general, vary very widely, it being possible for each of the polymers to become either a matrix or a disperse phase. By way of indication, the weight ratio A/B may range from 1/5 to 5/1. In the stable mixture C/D the weight ratio C/D may, in general, range from 1/10 to 10/1.

The preparation of the compositions A, B+C/D may take place in solution. However, and especially on the industrial scale, this preparation generally takes place in the melt, noncontinuously or continuously on extrusion machines that are commonly employed. According to an alternative form it is possible to "premix" the four constituents cold before introducing them into the extruder. According to another alternative form it is possible first to extrude the mixture C/D and then to introduce this mixture into an extruder at the same time as the polymers A and B.

The extrusion temperature is a function especially of the melting points of the various polymers A, B, C and D.

In general, it is at least 20° C. higher than the melting point of the constituent which has the highest melting point.

The articles obtained by extrusion of the compositions in accordance with the invention generally have a continuous phase and a disperse phase in the form of nodules whose mean diameter is generally between 0.1 and 5 μm and, preferably, between 0.2 and 3 μm.

The use of the "stable mixtures" makes it generally possible to obtain excellent mechanical properties which are greatly superior to those that can be obtained not only when working without any "mixture" but also when working with only one of the constituents of this mixture, as will become apparent on reading the Examples which follow and which are given merely by way of illustration.

EXAMPLES

The following Examples illustrate the invention:

Examples 1 to 19 and Controls.

a) The following extruders are employed in these Examples:

Werner ZSK 30 extruder [E1] 30 mm φ screw machine length: 36 diameters water trough lace cooling Kaufman twin-stage single-screw extruder [E2] 1st stage: 50 mm φ screw, 18 φ in length 2nd stage: 50 mm φ screw, 13 φ in length water trough lace cooling Buss PR 46/70 11 D mixer [E3] mixer: 46 mm φ screw, 11 φ in length discharge extruder: 70 mm φ screw, 3.5 φ in length water trough lace cooling Werner ZSK 40 twin-screw extruder [E4] 40 mm φ screw 40 φ machine length water trough lace cooling For all these extruders, extrusion is carried out with material temperatures of between 185 and 230° C.

b) The polymers employed, either as polymers A and B or as polymers C and D (within the meaning given above) are the following:

A1—Lacqtene® 2040 ML 55 HDPE is an HDPE of density 0.955 g/cm³ and of melt index 4 g/10 min at 190° C. under 2.16 kg (ISO standard 1133).

A2—Lacqtene® 2003 SN 53 HDPE is an HDPE of density 0.953 g/cm³ and of melt index 0.3 g/10 min at 190° C. under 2.16 kg (ISO standard 1133).

A3—EPR VM23 is an EPR concentrate diluted in a polyolefin, of density 0.89 g/cm³ and of melt index 0.6 g/10 min at 230° C. under 2.16 kg and 2.4 g/10 min at 230° C. under 5 kg (ISO standard 1133).

B1—KYNAR 6000 HD® PVDF is a vinylidene fluoride (VF2) homopolymer of melt index 13 g/10 min at 230° C. under 5 kg (ISO standard 1133).

B2—KYNAR 15000 HD® PVDF is a VF2 homopolymer of melt index 30 g/10 min at 230° C. under 5 kg (ISO standard 1133).

C1—Capa 680® PCL (poly-ε-caprolactone) is characterized by a melt viscosity at 190° C. which is higher than 1000 Pa s at a shear of 10 s$^{-1}$ and higher than 300 Pa s at a shear of 1000 s$^{-1}$.

C2—Capa 680® PCL grafted with glycidyl methacrylate (GMA) (GMA content: 1.2%).

D1—TYRIN CM674® 25% CLPE (chlorinated polyethylene) is characterized by a density of 1.10 g/cm³.

D2—TYRIN BH9000® 40% CLPE is characterized by a density of 1.20 g/cm³.

In Examples 5 and 6 the PCL or ClPE was pre-extruded on a FAIREX type single-screw extruder (45 mm φ screw and 26 φ in length) and then added to the HDPE and PVDF (ternary mixture) at the time of extrusion on extruder E1.

In the other Examples the four polymers are premixed and then introduced directly into the extruder entry.

With the mixtures obtained using the various extruders, flexural bars and tensile test specimens are prepared using an injection molding press at material temperatures of between 210 and 230° C.

TABLE I

| | | IMMISCIBLE POLYMERS | | | | STABLE MIXTURE | | | |
| | | Polymer A | | Polymer B | | Polymer C | | Polymer D | |
| Examples | Extruder | Nature | Weight % () | Nature | Weight % () | Nature | Weight % () | Nature | Weight % () |
|---|---|---|---|---|---|---|---|---|---|
| 1* | $E_1$ | $A_1$ | 61.3 | $B_1$ | 38.7 | — | 0.0 | — | 0.0 |
| 2* | $E_1$ | $A_1$ | 57.0 | $B_1$ | 36.0 | $C_1$ | 7.0 | — | 0.0 |
| 3* | $E_1$ | $A_1$ | 57.0 | $B_1$ | 36.0 | — | 0.0 | $D_1$ | 7.0 |
| 4* | $E_1$ | $A_1$ | 57.0 | $B_1$ | 36.0 | — | 0.0 | $D_2$ | 7.0 |
| 5 | $E_1$ | $A_1$ | 57.0 | $B_1$ | 36.0 | $C_1$ | 2.1 | $D_1$ | 4.9 |
| 6 | $E_1$ | $A_1$ | 57.0 | $B_1$ | 36.0 | $C_1$ | 2.1 | $D_2$ | 4.9 |
| 7 | $E_1$ | $A_1$ | 57.0 | $B_1$ | 36.0 | $C_1$ | 2.1 | $D_1$ | 4.9 |
| 8 | $E_1$ | $A_1$ | 57.0 | $B_1$ | 36.0 | $C_1$ | 2.1 | $D_2$ | 4.9 |
| 9* | $E_2$ | $A_1$ | 61.3 | $B_1$ | 38.7 | | 0.0 | — | 0.0 |
| 10* | $E_3$ | $A_1$ | 61.3 | $B_1$ | 38.7 | | 0.0 | — | 0.0 |
| 11 | $E_2$ | $A_1$ | 57.3 | $B_1$ | 36.2 | $C_1$ | 2.0 | $D_1$ | 4.5 |
| 12 | $E_3$ | $A_1$ | 57.3 | $B_1$ | 36.2 | $C_1$ | 2.0 | $D_1$ | 4.5 |
| 13 | $E_3$ | $A_1$ | 60.1 | $B_1$ | 37.9 | $C_1$ | 0.6 | $D_1$ | 1.4 |
| 14 | $E_3$ | $A_1$ | 57.3 | $B_1$ | 36.2 | $C_1$ | 3.3 | $D_1$ | 3.2 |
| 15 | $E_4$ | $A_1$ | 57.3 | $B_1$ | 36.2 | $C_1$ | 2.0 | $D_1$ | 4.5 |
| 16 | $E_4$ | $A_1$ | 57.3 | $B_1$ | 36.2 | $C_2$ | 2.0 | $D_1$ | 4.5 |
| 17 | $E_4$ | $A_1$ | 57.0 | $B_1$ | 36.0 | $C_1$ | 3.5 | $D_1$ | 3.5 |
| 18 | $E_4$ | $A_2$ | 18.0 | $B_2$ | 75.5 | $C_1$ | 2.0 | $D_1$ | 4.5 |
| 19 | $E_4$ | $A_3$ | 17.0 | $B_2$ | 76.5 | $C_1$ | 2.0 | $D_1$ | 4.5 |
| a | | $A_1$ | 100 | | | — | | — | |
| b | | | | $B_2$ | | — | | — | |

*Comparative
(**) On the total A + B + C + D

| | ISO R 5271 A tensile 23° C. | | ISO 178 flexure 23° C. | ISO 179 Af notched Charpy impact 23° C. Impact | SEM* MORPHOLOGY EXAMINATION Morphology | |
| Examples | at yield % | at break % | Modulus (MPa) | strength (kJ/m²) | type (on rod) | Mean size of the disperse phase |
|---|---|---|---|---|---|---|
| 1* | 5.2 | 5.8 | 1128 | 6.0 | Fibrils | >10 μm |
| 2* | 5.2 | 8.1 | 1012 | 4.1 | Nodules | ~5 μm |
| 3* | 5.9 | 11.9 | 1035 | 6.0 | Fibrils | >10 μm |
| 4* | 5.9 | 13.2 | 1015 | 5.6 | Fibrils | >10 μm |
| 5 | 10.9 | 225.0 | 941 | 10.7 | Nodules | ~0.5 μm |
| 6 | 12.7 | 131.0 | 939 | 7.2 | Nodules | ~1 μm |
| 7 | 12.1 | 192.0 | 938 | 11.0 | Nodules | ~0.5 μm |
| 8 | 12.7 | 285.0 | 908 | 7.8 | Nodules | ~1 μm |
| 9* | 5.5 | 5.7 | 1085 | 5.5 | | |

TABLE I-continued

| | | | | | | |
|---|---|---|---|---|---|---|
| 10* | 5.9 | 9.1 | 1014 | 5.7 | Fibrils | >10 µm |
| 11 | 9.9 | 99.0 | 941 | 7.0 | Nodules | ~2 µm |
| 12 | 10.3 | 138.0 | 925 | 9.5 | Nodules | ~0.5 µm |
| 13 | 8.5 | 60.0 | 1050 | 5.5 | | |
| 14 | 10.0 | 139.0 | 1012 | 9.0 | Nodules | ~1 µm |
| 15 | 9.5 | 205.0 | 949 | 8.6 | Nodules | ~1 to 2 µm |
| 16 | 9.4 | 107.0 | 940 | 9.1 | Nodules | ~1 to 2 µm |
| 17 | 9.6 | 54.0 | 964 | 9.1 | Nodules | ~1 to 2 µm |
| 18 | 8.9 | 55.9 | 1241 | 9.6 | Nodules | ~1 µm |
| 19 | 8.9 | 69.7 | 987 | 20.8 | Nodules | <0.5 µm |
| a | 9.2 | 784.0 | 955 | 7.8 | | |
| b | 7.8 | 54.0 | 1799 | 12.8 | | |

*Scanning electron microscope

Reading of Table 1 calls for the following comments:

Examples 1, 9 and 10 show that in the absence of compatibilizing agent the association of the polymers A and B results in:

a coarse morphology of the disperse phase (fibril)

a low elongation at yield and at break a low impact strength in relation to the pure PE matrix (line a)

Examples 2, 3 and 4 show that if only one of the components of the ClPE/PCL mixture is employed as compatibilizing agent the result remains poor:

coarse morphology low elongation at break low impact strength

Examples 5, 6, 7 and 8, 11, 12, 13, 14, 15 and 16 result in an association A and B of good quality:

fine nodular morphology improved elongation at yield (from 5% to 10–12%) [in relation to Examples 1 to 4 and 9–10]

but, above all, greatly improved elongation at break (from 6% to 100–250%) [in relation to Examples 1 to 4 and 9–10]

impact strength at least equal to that of the PE matrix (line a)

Examples 18 and 19 are with the fluorinated matrix.

Examples 20 to 26 and controls.

a) In these examples, a Werner ZSK 40 extruder as defined above is employed; the material temperatures during the extrusion are between 185 and 230° C.

b) The polymers employed, either as polymers A and B or as polymers C and D (within the meaning given above) are the following:

A2 A3 B1 C1 D1 as defined above.

A4—acqtene® 2008 SN 60 HDPE is an HDPE of density of 0.960 g/cm$^3$ and of melt index 0.8 g/10 min at 190° C. under 2.16 kg (ISO standard 1133).

A5—Engage EG® 8100 is a VLDPE obtained by metallocene catalysis of density 0.87 g/cm$^3$ and of melt index 1.0 g/10 min at 190° C. under 2.16 kg (ISO standard 1133) and containing 24% by weight of octene as comonomer.

A6—Kraton G1651®2003 SN 53 is a copolymer containing styrene blocks of styrene/ethylene/butene/styrene (SEBS) type in which the styrene/(ethylene+butene) ratio by mass is 32/68, of density 0.91 g/cm$^3$.

B3—Kynar 710® PVDF is a VF2 homopolymer of melt index 37 g/10 min at 230° C. under 5 kg (ISO standard 1133).

B4—Kynarflex 2850 EF® PVDF is a copolymer of VF2 and of hexafluoropropylene (HFP) of melt index 11 g/10 min at 230° C. under 5 kg (ISO standard 1133) and of flexural modulus at 23° C. of between 950 and 1,150 MPa (ISO standard 178).

TABLE II

| | | IMMISCIBLE POLYMERS | | | | STABLE MIXTURE | | | |
|---|---|---|---|---|---|---|---|---|---|
| | | Polymer A | | Polymer B | | Polymer C | | Polymer D | |
| Examples | Extruder | Nature | Weight % () | Nature | Weight % () | Nature | Weight % () | Nature | Weight % () |
| 20 | E$_4$ | A$_2$ | 18.0 | B$_1$ | 75.0 | C$_1$ | 2.1 | D$_1$ | 4.9 |
| 21 | E$_4$ | A$_3$ | 18.0 | B$_1$ | 75.0 | C$_1$ | 2.1 | D$_1$ | 4.9 |
| 22 | E$_4$ | A$_5$ | 18.0 | B$_1$ | 75.0 | C$_1$ | 2.1 | D$_1$ | 4.9 |
| 23 | E$_4$ | A$_3$ | 26.0 | B$_3$ | 67.0 | C$_1$ | 2.1 | D$_1$ | 4.9 |
| 24 | E$_4$ | A$_5$ | 26.0 | B$_3$ | 67.0 | C$_1$ | 2.1 | D$_1$ | 4.9 |
| 25 | E$_4$ | A$_6$ | 18.0 | B$_3$ | 75.0 | C$_1$ | 2.1 | D$_1$ | 4.9 |
| 26 | E$_4$ | A$_4$ | 18.0 | B$_4$ | 75.0 | C$_1$ | 2.1 | D$_1$ | 4.9 |
| c | | | | B$_1$ | 100.00 | | | | |
| d | | | | B$_3$ | 100.00 | | | | |
| e | | | | B$_4$ | 100.0 | | | | |

(**) on the total A + B + C + D

TABLE II-continued

| | ISO R 5271 A tensile 23° C. | | ISO 178 flexure 23° C. | ISO 180 notched Izod impact 23° C. |
|---|---|---|---|---|
| Examples | at yield % | at break % | Modulus (MPa) | Impact strength (kJ/m$^2$) |
| 20 | 10.2 | 41.0 | 1209 | 23.7 |
| 21 | 11.5 | 56.0 | 853 | NC |
| 22 | 12.2 | 113.0 | 851 | NC |
| 23 | 8.9 | 96.1 | 485 | 5.8 |
| 24 | 10.4 | 282.1 | 724 | 7.2 |
| 25 | 14.0 | 275.1 | 762 | 7.9 |
| 26 | 12.5 | 70.8 | 846 | 15.5 |
| c | 8.2 | 59.0 | 1684 | 13.5 |
| d | 7.3 | 55.6 | 1878 | 6.7 |
| e | 10.4 | 103.2 | 1037 | 10.0 |

Reading of Table 2 calls for the following comments:

Examples 21 to 23 result in an association A and B of good quality, and in particular:

improved impact strength in relation to that of the PVDF matrix (line c).

Examples 24 to 26 result in an association A and B of good quality, and in particular:

elongations at yield and at break which are greatly improved in relation to those of the PVDF matrix (line d)

Example 26 results in an association A and B of good quality:

improved impact strength in relation to that of the PVDF matrix (line e).

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

I claim:

1. Composition consisting essentially of two essentially immiscible polymers A and B and a stable mixture of at least two polymers C and D, each of these polymers C and D being individually at least partially miscible with one of the polymers A and B, wherein the polymers A and B are selected from the group consisting of the following pairs:
polyethylene (PE)/polyamide (PA)
polyethylene/polyisobutene
polypropylene (PP)/other polyolefin
PP/PA
PVC (polyvinyl chloride)/polyolefin
ABS (acrylonitrile/butadiene/styrene)/PA
PC/polyester
PC/ABS whose acrylonitrile content results in immiscibility
PVDF (polyvinylidene fluoride)/polyolefin and
PVDF/rubber (polyethylene/propylene), wherein the stable mixture of at least two polymers C and D is selected from the group consisting of:
PVC/ABS
PVC/ASA (styrene/acrylonitrile grafted onto acrylic polymer)
PVC/PMMA (polymethyl methacrylate)
PVC/polyurethane
ABS/SMA (styrene/maleic anhydride copolymer)
ABS/polyamides (PA)
Poly(2,6-dimethyl-1,4-phenylene ether) (PPE)/polystyrene
PPE/PA
PPE/polyolefin
Chlorinated polyolefin/aliphatic polyester
Polyetherimide/polyetherketone (PEK) or Polyetheretherketone (PEEK)
Polysulphide or polyethersulphide/ABS, PET or PBT (polyethylene or polybutylene terephthalate) and
PVDF/PMMA, and wherein the mixture of at least two polymers C and D constitutes a compatibilization system for the two essentially immiscible polymers A and B.

2. Composition according to claim 1, wherein the interfacial tension of the mixture $|\delta_{CD}|$ is at most to 10 mN/m.

3. Composition according to claim 1, wherein the weight ratio of the polymers C and D range from 1/10 to 10/1.

4. Composition according to claim 1, wherein the weight ratio of the polymers A and B range from 1/5 to 5/1.

5. Composition according to claim 1, wherein the weight ratio of polymer C+polymer D / polymer A+polymer B ranges from 1/100 to 20/100.

6. Articles obtained from compositions according to claim 1.

* * * * *